United States Patent
Schlueter, Jr. et al.

(10) Patent No.: US 6,311,595 B1
(45) Date of Patent: Nov. 6, 2001

(54) PROCESS AND APPARATUS FOR PRODUCING AN ENDLESS SEAMED BELT

(75) Inventors: Edward L. Schlueter, Jr., Rochester; Laurence J. Lynd, Macedon; Donald W. Owens; Eric J. Smith, both of Rochester; Alex Skirko; David Watro, both of Webster, all of NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 08/721,418

(22) Filed: Sep. 26, 1996

(51) Int. Cl.[7] .................. B26D 7/00; B26F 1/00
(52) U.S. Cl. .................. 83/145; 83/620; 83/685; 83/686; 83/690; 83/687; 83/691
(58) Field of Search .................. 83/130, 140, 143, 83/145, 146, 148, 162, 918, 917, 686, 693, 590, 620, 659, 111, 375, 378, 333, 569, 568, 566, 571, 613, 618, 621, 684–687, 690, 691, 695; 29/415, 416

(56) References Cited

U.S. PATENT DOCUMENTS

| | | | | |
|---|---|---|---|---|
| 105,934 | * | 8/1870 | Gardner | 83/590 |
| 382,357 | * | 5/1888 | Gennert et al. | 83/143 X |
| 411,492 | * | 9/1889 | Draper | 83/145 |
| 1,303,687 | | 5/1919 | Leffler . | |
| 1,474,774 | * | 11/1923 | Fuller | 24/38 |
| 1,491,659 | * | 4/1924 | Barton | 83/590 |
| 1,660,387 | * | 2/1928 | Masel | 83/918 X |
| 1,735,780 | * | 11/1929 | Nickerson | 83/145 X |
| 2,461,859 | | 2/1949 | Vasselli . | |
| 2,792,318 | | 5/1957 | Welch . | |
| 4,030,390 | * | 6/1977 | Heiting | 83/143 X |
| 4,191,080 | * | 3/1980 | Graham | 83/620 X |
| 4,539,880 | * | 9/1985 | Barber et al. | 83/620 X |
| 4,624,126 | | 11/1986 | Avila et al. | 72/453.14 |
| 4,878,985 | | 11/1989 | Thomsen et al. | 156/459 |
| 5,286,586 | | 2/1994 | Foley et al. | 430/56 |

* cited by examiner

*Primary Examiner*—Boyer Ashley

(57) ABSTRACT

A novel method and apparatus for producing an endless flexible seamed belt using a punch and die is disclosed. The punch and die have patterned edges in the form of a puzzle cut pattern with extremely small nodes and kerfs. The cutting tolerances of the patterned edges make it necessary to fix the punch with respect to the die so that there is no misalignment of the punch and die between cutting operations. This is accomplished by resiliently fixing the punch to the die, rather than having the punch attached to the force generating assembly as in normal punch and die assemblies. Belt material is positioned between a stock gap between the punch and die and the force generating assembly is activated to provide the cutting force. Once the belt material is cut, the cutting force is removed and the force generating assembly returns to its retracted position. There are two cutting edges on the punch and die so that a first end of one belt and a second end of another belt are formed in a single cutting operation.

8 Claims, 9 Drawing Sheets

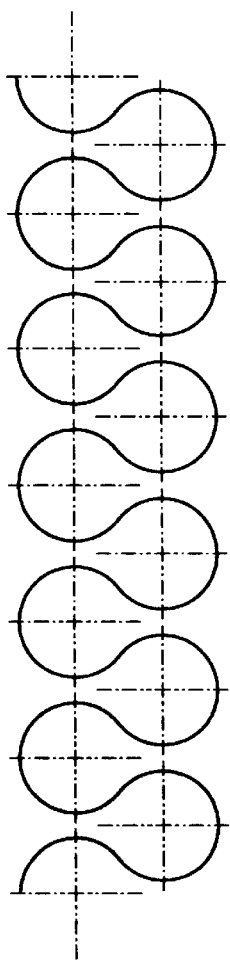 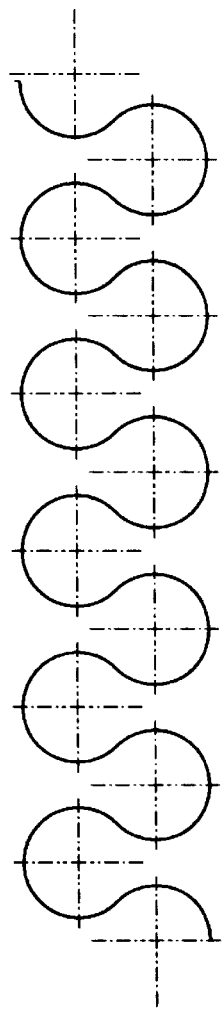 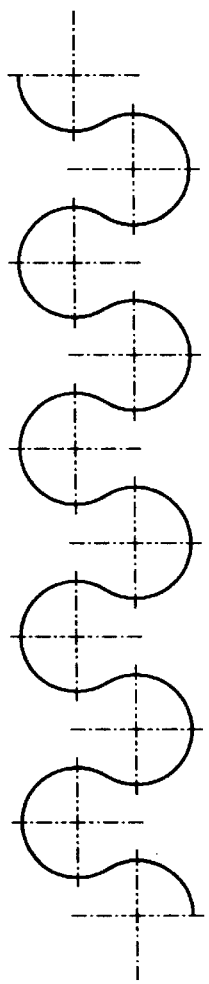
FIG. 6A   FIG. 6B   FIG. 6C

PROCESS AND APPARATUS FOR PRODUCING AN ENDLESS SEAMED BELT

CROSS REFERENCE TO RELATED APPLICATIONS

Attention is hereby directed to U.S. patent application Ser. No. 08/297,200) entitled "Puzzle Cut Seamed Belt", now U.S. Pat. No. 5,514,436, issued May 7, 1996; U.S. patent application Ser. No. 08/297,158 entitled "Puzzle Cut Seamed Belt With Strength Enhancing Strip", now continuing U.S. patent application Ser. No. 08/522,622, filed Aug. 31, 1995; U.S. patent application Ser. No. 08/297,201 entitled "Puzzle Cut Seamed Belt With Bonding Between Adjacent Surface By UV Cured Adhesive", now U.S. Pat. No. 5,487,707, issued Jan. 30, 1996; U.S. patent application Ser. No. 08/297,206 entitled "Endless Seamed Belt with Low Thickness Differential Between the Seam and the Rest of the Belt", allowed, but not yet issued; and U.S. patent application Ser. No. 08/297,203 entitled "Puzzle Cut Seamed Belt with Bonding Between Adjacent Surfaces", all commonly assigned to the assignee of the present invention and filed on Aug. 29, 1994.

This invention relates generally to a process and apparatus for producing an endless seamed belt, and more particularly concerns the configuration of the die press components used to cut a flexible seamless belt with interlocking patterned ends.

Initially, belts were fabricated by taking two ends of a web material and fastening them together by a variety of techniques such as sewing, wiring, stapling, providing adhesive joints, etc. While such joined or seamed belts are suitable for many applications, such as the delivery of rotary motion from a source such as a motor, to implement a device such as a saw blade, they are not as satisfactory in many of the more sophisticated applications of belt technology in common practice today. In the technology of the current day many applications of belts require much more sophisticated qualities and utilities and in particular for such special applications as in electrostatographic and electrographic imaging apparatus and processes for use as photoreceptors, intermediate sheet and/or image transport devices, fusing members or transfix devices it is ideal to provide a seamless belt whereby there is no seam in the belt which mechanically interferes with any operation that the belt performs or any operation that may be performed on the belt. While this is ideal the manufacture of seamless belts requires rather sophisticated manufacturing processes which are expensive and are particularly more sophisticated, difficult and much more expensive for the larger belts. As a result, various attempts have been made to provide seamed belts which can be used in these processes. Previous attempts to manufacture seamed belts have largely relied on belts where the two ends of the belt material have been lapped or overlapped to form the seam or have butted against one another and then fastened mechanically by heat or other means of adhesion such as by the use of an adhesive or ultrasonic welding.

The belts formed according to the typical butting technique while satisfactory for many purposes are limited in bonding, strength and flexibility because of the limited contact area formed by merely butting the two ends of the belt material. Furthermore, belts formed according to the butting or overlapping technique provide a bump or other discontinuity in the belt surface leading to a height differential between adjacent portions of the belt, of 0.010 inches or more depending on the belt thickness, which leads to performance failure in many applications. For example, one of the most severe problems involves cleaning the imaging belt of residual toner after transfer of the toner image. Intimate contact between the belt and cleaning blade is required. With q bump, crack or other discontinuity in the belt the tuck of the blade is disturbed which allows toner to pass under the blade and not be cleaned. Furthermore, seams having differential heights may when subjected to repeated striking by cleaning blades cause the untransferred, residual toner to be trapped in the irregular surface of the seam. Furthermore, photoreceptors which are repeatedly subjected to this striking action tend to delaminate at the seam when the seam is subjected to constant battering by the cleaning blade. As a result, both the cleaning life of the blade and the overall life of the photoreceptor can be greatly diminished as well as degrading the copy quality. In addition, such irregularities in seam height provide vibrational noise in xerographic development which disturb the toner image on the belt and degrades resolution and transfer of the toner image to the final copy sheet. This is particularly prevalent in those applications requiring the application of multiple color layers of liquid or dry developer on a photoreceptor belt, which are subsequently transferred to a final copy sheet. In these applications, it is desired to provide a seam height differential between the seam and the unseamed adjacent portions less than 0.001 inch. In addition, the presence of the discontinuity in belt thickness reduces the flex life and continuity of strength of the belt which for prolonged use is desirably 80–90% that of the parent material unseamed. In addition, the discontinuity or bump in such a belt may result in inaccurate image registration during development, inaccurate belt tracking and overall deterioration of motion quality, as a result of the translating vibrations.

An endless seamed belt can be formed with patterned interlocked ends, the pattern of the ends being formed by using a laser or a die to cut the pattern and the patterned cut ends being brought together to interlock to form a seam. In experiments the patterned seams were first generated using a $CO_2$ laser programmed to make various patterned node sizes and spacings. The laser was an excellent tool for quickly changing geometries and conditions, however it was a costly and timely process and an inappropriate process for manufacturing seams for large volumes of belts. A 1 inch length punch press die was designed to cut small belt seam samples for testing purposes. The die cut is much faster and cleaner than the laser cut and the die cut was determined to be the preferred method to be used in the patterned seam belt manufacturing process. However, the size, approximately 0.5 mm, and spacings, approximately 25 microns, of the nodes of the pattern require very accurate cutting by a die and it was thought to be impossible for a die to maintain such demanding tolerances for the width of an operational belt seam.

The following disclosures may be relevant to various aspects of the present invention:

U.S. Pat. No. 1,303,687

Inventor: C. Leffler

Issued: May 13, 1919

U.S. Pat. No. 2,461,859

Inventor: A. J. Vasselli

Issued: Feb. 15, 1949

U.S. Pat. No. 2,792,318

Inventor: H. P. Welch

Issued: May 14, 1957

U.S. Pat. No. 4,878,985

Inventor: Thomsen et al.

Issued: Nov. 7, 1989

U.S. Pat. No. 5,286,586

Inventor: Foley et al.

Issued: Feb. 15, 1994

U.S. Pat. No. 4,624,126

Inventor: Avila et al.

Issued: Nov. 25, 1986

Some relevant portions of the foregoing disclosures may be briefly summarized as follows:

U.S. Pat. No. 1,303,687 teaches forming a container from a body blank with the ends dovetailed together and a covering sheet which extends beyond the end of the body and has its extending portion secured down, overlapping the dovetail joint to secure and finish the container. In forming the container, the body blank is wrapped around a forming mandrel of the desired shape and the two dovetail ends are interlocked. At the same time the extending ends of the covering sheet, which are provided with adhesive, are stuck down overlapping the joint.

U.S. Pat. No. 2,461,859 teaches an endless flexible belt with a patterned dovetail joint. A single die cut may cut both ends of the patterned dovetail joint at the same time. The ends of the belt are cut to form a male and female end with a plurality of spaced dovetailed tabs, the female end fitting into the male end and the dovetailed tabs interlocking with each other. An adhesive may be used at the belt joint.

U.S. Pat. No. 2,792,318 discloses forming splice joints in fibrous material, each joint being cut so that an interlocking tongue and groove pattern is formed. The tongues and grooves may be different shapes. In the finished product, the joints are oriented at a diagonal with respect to the sides. A coating material may be used to maintain the interfitted tongues and grooves, however, it is the interlocking connection of the tongues and grooves that provides the tensile strength of the joint.

U.S. Pat. Nos. 4,878,985 and 5,286,586 disclose fabricating thin flexible endless belts used in electrophotographic printing systems. The patents teach overlapping the ends of the belt and welding the ends together to form an endless belt.

U.S. Pat. No. 4,624,126 teaches a hydraulic press with a cylinder arrangement for equalizing forces in the event of unequal loading of the press.

All of the above references are herein incorporated by reference.

SUMMARY OF THE INVENTION

One aspect of the invention is drawn to an apparatus for producing an endless flexible seamed belt from belt material stock including a belt material positioner which positions the belt material stock for cutting; a die assembly including a die with a first die cutting edge having a first die pattern; a punch assembly including a punch with a first punch cutting edge having a first punch pattern that is complementary to the first die pattern; and a force generating assembly which generates a cutting force in a cutting operation in which the punch and die cut the belt material so that a first patterned end is formed on a first end of the belt and a second patterned end is formed on a second end of the belt, wherein the first and second patterned ends of the belt are cut in a puzzle cut pattern with mutually mating elements which fit together to form a seam when joined mechanically to enable the endless flexible seamed belt to essentially function as an endless belt having a substantially uniform thickness.

Another aspect of the invention is drawn to a method of making an endless flexible seamed belt from belt material stock including positioning the belt material stock between a die assembly and a punch assembly, the die assembly including a die with a first die cutting edge having a first die pattern and the punch assembly including a punch with a first punch cutting edge having a first punch pattern that is complementary to the first die pattern; applying a cutting force from a force generating assembly to a force receiving surface on the punch assembly so that the die and punch cut the belt material to form a first patterned end on a first end of the belt and a second patterned end formed on a second end of the belt; and removing the cutting force from the punch assembly, wherein the first and second patterned ends of the belt are cut in a puzzle cut pattern with mutually mating elements which fit together to form a seam when joined mechanically to enable the endless flexible seamed belt to essentially function as an endless belt having a substantially uniform thickness.

In a manufacturing mode, it is desirable to have a fast and accurate method of forming the puzzle cut seam design. Using a die to cut the flexible belt material is much quicker than using a laser to form the puzzle cut seam. The die cut is also cleaner than the laser cut due to the fact that the laser melts the belt material, which is a particular problem in a multi-layered belt. Having a clean puzzle cut seam is very important when the belt is used in an electrophotagraphic machine environment due to the very small distances between the electrophotagraphic process elements and the belt. A special die with a tolerance of 0.0002 inch runout in a 60 inch linear plane was designed and fabricated to cut the small nodes and spacings of the puzzle cut seam. In order to maintain the close tolerances of the patterned cutting edges of the die, a novel die press and method of using the die had to be invented. The die is formed so that the back end of one belt is formed in the same punch as the front end of another belt. This results in a small area of waste material between the two ends, however the time and energy saved in placing and cutting the two ends independently far outweigh the cost of the waste material.

BRIEF DESCRIPTION OF THE DRAWINGS

Other features of the present invention will become apparent as the following description proceeds and upon reference to the drawings, in which:

FIGS. 6A, 6B and 6C are three representations of the puzzle cut configuration which will be discussed hereinafter.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

DETAILED DESCRIPTION OF THE INVENTION

Figure 8:
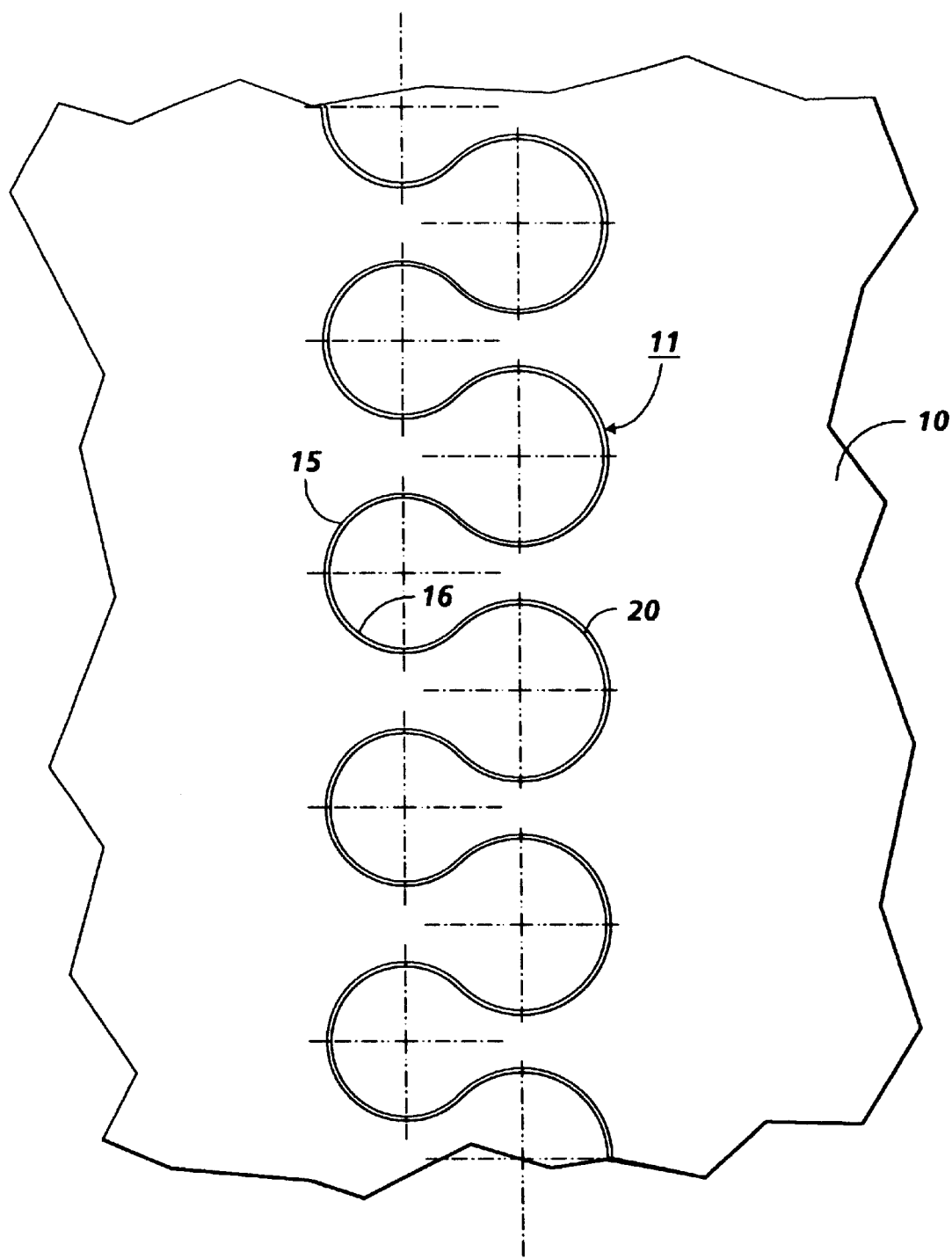
FIG. 8 is a greatly exaggerated in scale representation of the seam type geometry, a very narrow kerf 20, that will be bonded by heat and pressure alone.

With continued reference to the Figures and additional reference to the following description the invention will be described in greater detail. The seam formed according to the present invention is one of enhanced strength, flexibility and mechanical life which is held together by the geometric relationship between the ends of the belt material, which are fastened together by a puzzle cut, meaning that the two ends interlock with one another in the manner of an ordinary puzzle and wherein the seam has voids or a kerf 20 between the surfaces of mutually mating elements, the opposite surfaces of the puzzle cut pattern being joined together to enable the seamed flexible belt to essentially function as an endless belt. The joining of the opposite surfaces of the mutually mating elements forming the seam may be either a physical joining, chemical joining or some combination of physical and chemical joining. The opposite surfaces of the puzzle cut pattern may alternatively be bound with an adhesive which is physically and chemically compatible with the belt material. Typically, this joining provides a bonding between the opposite surfaces of the mutual mating elements which provides an improved seam quality and smoothness with substantially no thickness differential between the seam and the adjacent portions of the belt thereby providing enhanced imaging, registration and control as discussed above. In this regard, it should be noted that the lower the differential in height, the faster that the belt may travel. In any case, the opposite surfaces of the puzzle cut pattern being joined together are bound with sufficient physical integrity to enable the seamed flexible belt to essentially function as an endless belt. The two ends of the seamed belt may be joined by heating such as by welding, including ultrasonic welding, arc welding and impulse welding, wherein top and bottom elements similar to those that are used to seal plastic bags have two arms which apply pressure and then the elements are heated. In the case of thermoplastic belt materials the thermoplastic nodes may be deformed by heating and may flow into the voids to form or link together and physically form the bond. As illustrated in FIG. 8 a very narrow kerf between thermoplastic ends of the belt may be filled by the mere application of heat and pressure. This is like welding the two nodes together. This technique of course is not applicable to thermoset materials.

Alternatively the two ends of the belt having the puzzle cut pattern at each end may be joined by a chemical reaction. This happens in the instance where the belt material is a thermoplastic and upon heating the thermoplastic at least softens, if not melts, and flows to fill the voids in the seam.

Another alternative is to apply an adhesive to the voids between the mutually mating elements, and in particular, to the opposite surfaces of the puzzle cut pattern. With the use of an adhesive a much wider kerf may be used than the very narrow kerf that may be used for bonding by heat and pressure only thermoplastic materials. This also permits the adhesive to wick into the void or kerf areas. In this regard, the viscosity of the adhesive is important since it's performance depends on it's ability to wick into the voids or the kerf 20 between adjacent cut pieces of the pattern. Accordingly, a relatively high viscosity adhesive will not perform as satisfactorily as a low viscosity adhesive. In addition, the surface energy of the adhesive must be compatible with the material from which the belt is fabricated so that it adequately wets and spreads in the belt seam. As previously described good adhesion is required to enable the performance requirements previously discussed with regard to comparing it to the original material. If the belt is made of a thermoplastic or thermoset material, i is quite convenient to use thermoplastic or thermoset adhesives which melt and flow at a temperature below that of the belt material but do not soften enough or flow during the belt's operation. The kerf 20, the distance between adjacent surfaces of the mutually mating elements of the belt ends can be built into the belt ends by way of a mechanical die or it can be built into by way of cutting with a laser pattern. If the belt material is a thermoplastic, a thermoplastic or thermoset or otherwise crosslinked adhesive may also be used and indeed may be based on the same material that the belt is fabricated from. However, if the belt material is thermosetting then a thermoplastic or thermoset adhesive may be used to fill the voids between the opposite surfaces of the puzzle cut pattern. Typically, a hot melt adhesive may be used, which is one that is solid at room temperature, however, when heated will flow. Typical thermoplastic hot melt adhesives include polyamides, urethanes, polyesters. Typical thermosetting materials include epoxies, polyimides, cyanoacrylates and urethanes. Following bonding, whether it be physical, chemical or by way of adhesive or any combination of the above, although it may not be necessary, it may be desirable to apply pressure to flatten the seam to make it as uniform as possible and control any thickness differential.

Figure 1:
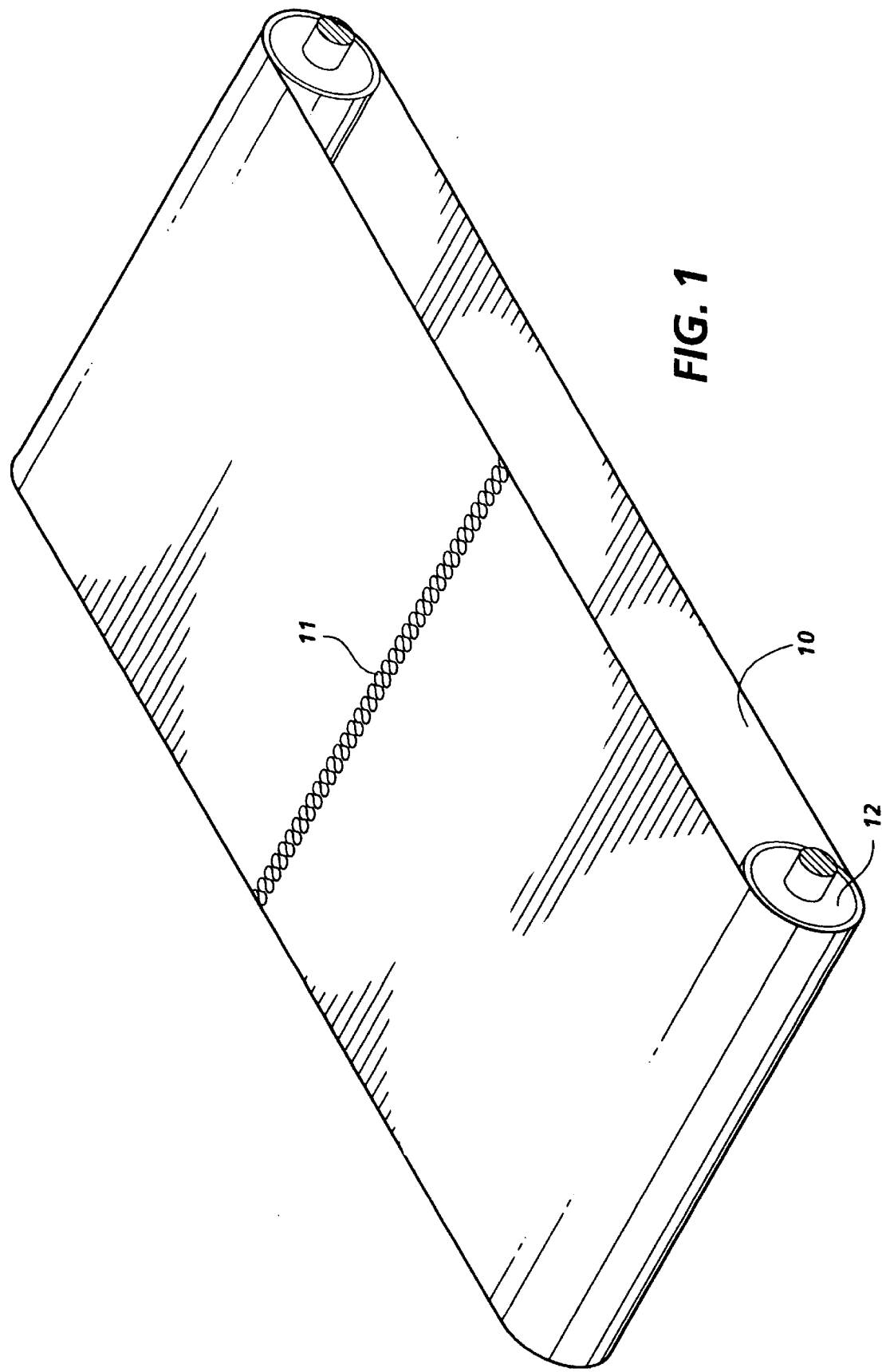
FIG. 1 is an isometric representation of the flexible puzzle cut seamed belt providing a mechanically invisible and substantially equivalent seam in performance to that of a seamless belt.

Referring to FIG. 1, it should be noted that the mechanical interlocking relationship of the seam 11 is present in a two dimensional plane when the belt 10 is on a flat surface, whether it be horizontal or vertical. While the seam is illustrated in FIG. 1 as being perpendicular to the two parallel sides of the belt it will be understood that it may be angled or slanted with respect to the parallel sides. This enables any noise generated in the system to be distributed more uniformly and the forces placed on each mating element or node to be reduced.

The endless flexible seamed belt may be made of any suitable material. Any suitable belt material may be employed. Typical materials include, photoreceptor materials which may be multilayered such as those described in U.S. Pat. No. 4,265,990, as well as a variety of thermoplastic and thermosetting belt materials. Typical materials include polyesters, polyurethanes, polyimides, polyvinyl chloride, polyolefins such as polyethylene and polypropylene and polyamides such as nylon, polycarbonates, acrylics. In addition, elastomeric materials such as silicones, fluorocarbons such as Vitons E. I. DuPont™, EPDM and nitriles etc. For certain purposes, metallic; cloth and even paper may be used. The belt material is selected to have the appropriate physical characteristics for specific utilities such as tensile strength, Young's modulus, typically $1 \times 10^3$ to $1 \times 10^6$, electroconductivity, typically $10^8$ to $10^{11}$ ohm cm volume resistivity, thermal conductivity, stability, flex strength and in certain applications, such as transfix, being capable of being subjected to high temperatures. Other important characteristics of the belt material include surface energy desired low for good toner release, for example, gloss, dielectric constant and strength.

The puzzle cut pattern may be formed according to any conventional shaping technique, such as by die cutting or laser cutting with commercially available lasers, such as a CO2 laser or excimer laser generating a beam of sufficient width and intensity that within an acceptable time will provide the desired cut. Following cutting by the laser beam it can be deburred and cleaned by air, ultrasonics or brushing if necessary. In addition to puzzle cut patterns formed by joining the two ends, they may be formed on each of the ends by a male and female punch with the belt material in between which punches out the shape. Alternatively, it could be a pattern on a wheel which rolls over the material.

Figure 2:
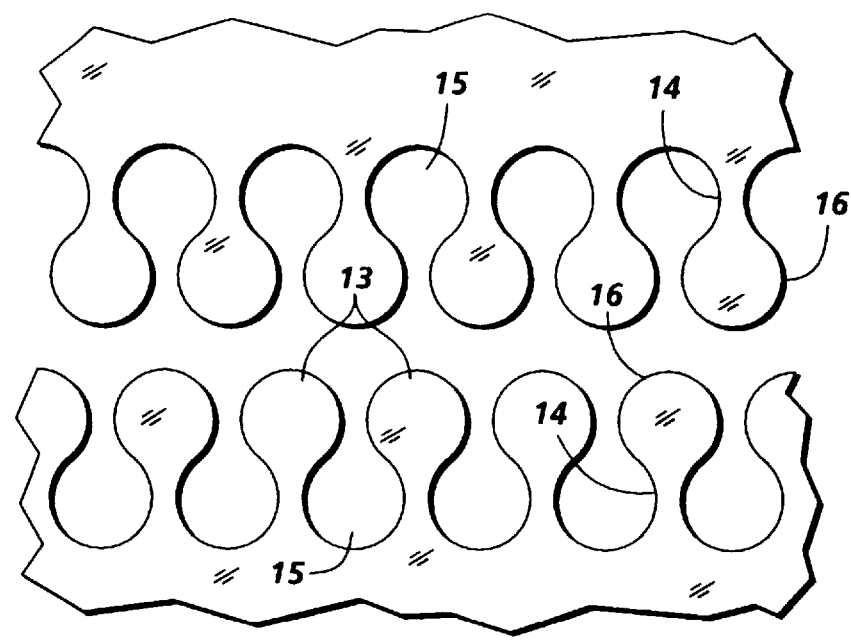
FIG. 2 is an enlarged view of a puzzle cut pattern used on both joining ends of the belt material to provide interlocking elements having a post portion 14 and a larger head portion 16.
Figure 3:
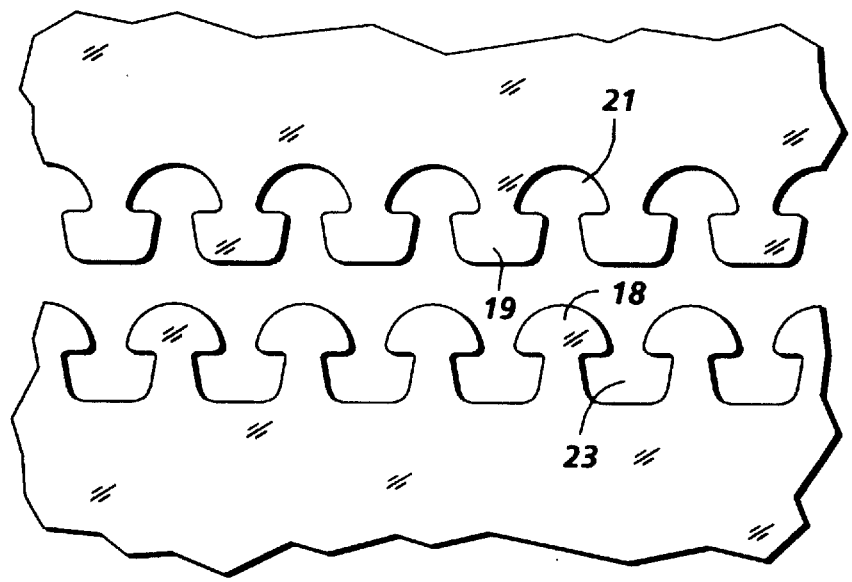
FIG. 3 is illustrative of an alternative configuration wherein male 18, 19 and female 21, 23 interlocking portions having curved mating elements are used in the two ends of the belt material which are joined.
Figure 4:
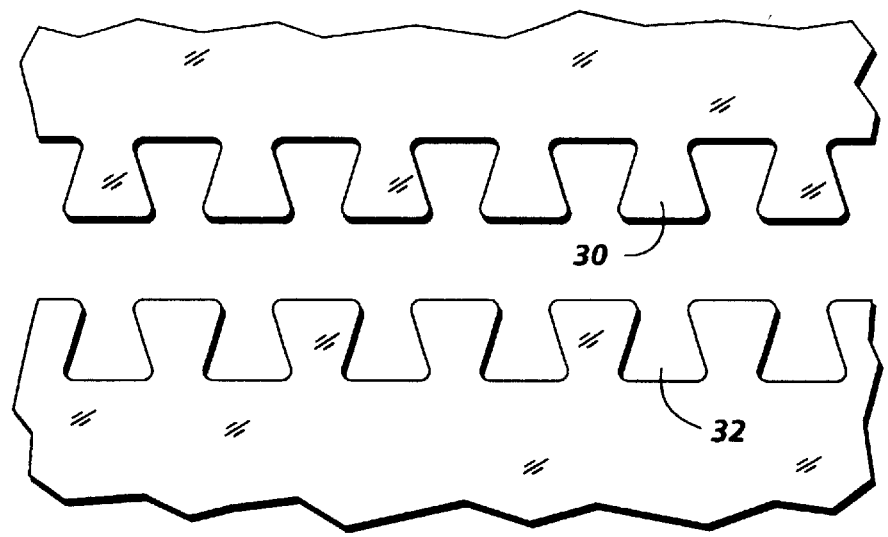
FIG. 4 is a further alternative embodiment wherein the interlocking elements 30, 32 form a dovetail pattern having curved mating elements.
Figure 5:
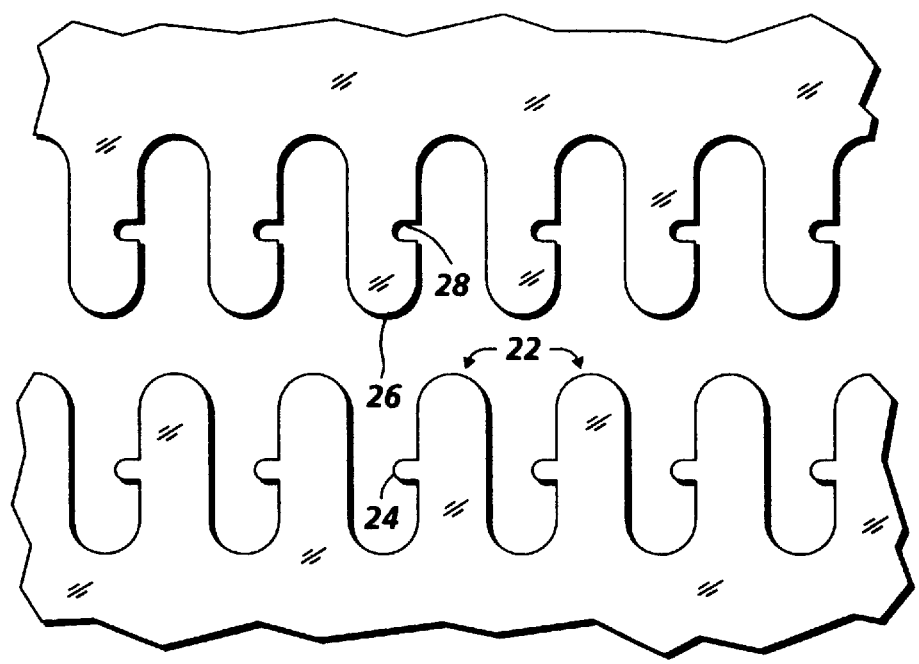
FIG. 5 is an additional alternative embodiment wherein the interlocking relationship between the puzzle cut pattern on both ends is formed from a plurality of finger joints 22, 26.

As may be observed from the drawings, the puzzle cut pattern may take virtually any form, including that of nodes such as identical post or neck 14 and head or node 16 patterns of male 13 and female 15 interlocking portions as illustrated in FIG. 2, or a more mushroom like shaped pattern having male portions 18 and 19 and female portions 21 and 23 as illustrated in FIG. 3 as well as a dovetail pattern as illustrated in FIG. 4. The puzzle cut pattern illustrated in FIG. 5 has a plurality of male fingers 22 with interlocking teeth 24 and plurality of female fingers 26 which have recesses 28 to interlock with the teeth 24 when assembled. It is important that the interlocking elements all have curved mating elements to reduce the stress concentration between the interlocking elements and permit them to separate when traveling around curved members such as the rolls 12 of FIG. 1. It has been found that curved mating elements uniformly distribute stress, while square corner elements concentrate stress, the concentrated stress leading to possible failure. The mechanical bonding, strength and flexibility of the bond should be capable of supporting a belt cycling of at least 500,000 cycles and the height differential between the seamed portion and the unseamed portion on each side of the seam about 0.001 inch and the seam have a tensile strength of at least 80% and preferably 90% of the parent belt material strength.

The following is a discussion of the interrelationship among the various belt and material parameters involved in the mechanical integrity of the seam. The mechanical integrity of the seam was examined and analyzed for a number of configurations and in particular for the preferred configuration which involves nodes forming parts of a circle and interconnecting via a neck on the opposite side. To determine the deflection under loading conditions, each such node is treated as a beam fixed at the narrowest part of the neck joining the node to the base and the deflection of each tooth (node and neck) is calculated in terms of the orientation of the load relative to the beam. To assure that the seam will not come apart under load, it is imposed that the maximum deflection of each tooth, when the load, under worse conditions, is normal to the beam, would not exceed the thickness of the belt itself. Clearly, if the deflection of the tooth is in excess of the thickness of the belt then the seam will come apart. Under the above brief analysis, a master relationship connecting a material parameter M typical of the configuration with a geometric parameter G such that the belt will not come apart under loading.

$$M = \frac{1-G}{\left(1 + \sqrt{4 - \frac{1}{G^2}}\right)^3} \tag{1}$$

In this relationship M is a dimensionless quantity given by $$M = \frac{4NR^3}{Et^4} \tag{2}$$

and G represents the ratio $$G = \frac{2R}{w} \tag{3}$$

where N is the total load per unit width (i.e. lbs/in.) acting on the belt, E is the modulus of elasticity of the belt material, t the thickness of the belt, R the radius of-the circular node forming the seam, and w is the wave length of one whole period between two adjacent nodes. Equation (1) is a one-to-one relationship between the material parameter M and the geometric parameter G. Thus, given one of them we can find the other parameter. Furthermore, because of the dimensionless nature of these two parameters, a multitude of configurations are embodied in each pair of values satisfying equation (1), by virtue of the fact that there is an infinite number of combinations of the variables involved in that particular pair of values of M and G. Inspection of the geometry of the node shows that the structure is characterized by two main features: the shoulder, or that portion where there is interference between adjacent teeth, which supports the seam, and the neck of each tooth which represents its strength under loading. The size of the shoulder should be sufficient to insure mechanical integrity of the seam without making the neck too small as to weaken its strength. In this regard attention is directed to FIGS. 6A, 6B and 6C wherein it can be visually observed that the size of the neck in FIG. 6A is too small and the size of the shoulder in FIG. 6C does not provide sufficient interference contact while the geometry in FIG. 6B appears to be optimum. Table 1 below lists the various parameters for the identified belt characteristics. While all samples will function as noted above, a value of G of 0.6 is a good compromise. Many of the samples of course are impractical to implement relative to factors such as manufacturing ease, costs, stress tolerance, etc. Equation (3) shows that G can only vary between ½ and 1, the first value refers to the case when the shoulder is zero, and the second value pertains to the case when the neck of the tooth is zero and the node has no strength. Once either M or G is known the entire configuration becomes determinate with the help of the above equations and other standard geometric relationships. Measurements on actual belts have generally confirmed the above analysis. To illustrate the solution methodology, suppose a belt material of Young's modulus $E=5\times 105$ psi and thickness $t=0.004"$ is subjected to a tension $N=2.0$ lb./in. of belt width. H is the perpendicular height between centers of one node or one side of the seam and a node on the other side of the seam. The solution possibilities are given in Table 1 below such that the seam will not come apart. If a value $G=0.6$ is chosen as a compromise between seam integrity and node strength, we find

|   | Node Diameter<br>Period<br>Neck Width<br>Node Height |   | D = 0.448 mm<br>w = 0.747 mm<br>g = 0.299 mm<br>H = 0.69696 |   |   |
|---|---|---|---|---|---|
| G | 1/M | D | W | g | H |
| .5000 | 2.000 | 1.0160 | 2.0320 | 1.0160 | 1.0160 |
| .5100 | 5.5296 | .7239 | 1.4194 | .6955 | .8665 |
| .5200 | 7.7482 | .6469 | 1.2440 | .5971 | .8246 |
| .5300 | 9.7913 | .5984 | 1.1290 | .5306 | .7968 |
| .5400 | 11.7592 | .5629 | 1.0424 | .4795 | .7755 |
| .5500 | 13.6903 | .5351 | .9729 | .4378 | .7580 |
| .5600 | 15.6054 | .5122 | .9147 | .4025 | .7429 |
| .5700 | 17.5179 | .4929 | .8647 | .3718 | .7295 |
| .5800 | 19.4383 | .4761 | .8208 | .3448 | .7174 |
| .5900 | 21.3751 | .4612 | .7818 | .3205 | .7061 |
| .6000 | 23.3363 | .4479 | .7466 | .2986 | .6956 |
| .6100 | 25.3292 | .4359 | .7146 | .2787 | .6856 |
| .6200 | 27.3614 | .4248 | .6852 | .2604 | .6760 |
| .6300 | 29.4406 | .4146 | .6580 | .2435 | .6668 |
| .6400 | 31.5747 | .4050 | .6328 | .2278 | .6578 |
| .6500 | 33.7722 | .3960 | .6093 | .2132 | .6491 |
| .6600 | 36.0424 | .3875 | .5872 | .1996 | .6405 |
| .6700 | 38.3950 | .3794 | .5663 | .1869 | .6320 |
| .6800 | 40.8411 | .3717 | .5466 | .1749 | .6236 |
| .6900 | 43.3927 | .3643 | .5279 | .1637 | .6153 |
| .7000 | 46.0632 | .3571 | .5101 | .1530 | .6070 |
| .7100 | 48.8678 | .3501 | .4931 | .1430 | .5987 |
| .7200 | 51.8235 | .3433 | .4769 | .1335 | .5904 |
| .7300 | 54.9497 | .3367 | .4612 | .1245 | .5820 |
| .7400 | 58.2687 | .3302 | .4462 | .1160 | .5736 |
| .7500 | 61.8060 | .3238 | .4317 | .1079 | .5651 |
| .7600 | 65.5913 | .3174 | .4176 | .1002 | .5565 |
| .7700 | 69.6594 | .3111 | .4040 | .0929 | .5477 |
| .7800 | 74.0510 | .3048 | .3908 | .0860 | .5388 |
| .7900 | 78.8149 | .2986 | .3779 | .0794 | .5297 |
| .8000 | 84.0090 | .2923 | .3653 | .0731 | .5204 |
| .8100 | 89.7035 | .2860 | .3530 | .0671 | .5109 |
| .8200 | 95.9840 | .2796 | .3410 | .0614 | .5012 |
| .8300 | 102.9563 | .2731 | .3291 | .0559 | .4911 |
| .8400 | 110.7522 | .2666 | .3173 | .0508 | .4807 |
| .8500 | 119.5388 | .2599 | .3057 | .0459 | .4700 |
| .8600 | 129.5306 | .2530 | .2942 | .0412 | .4588 |
| .8700 | 141.0081 | .2459 | .2827 | .0367 | .4472 |
| .8800 | 154.3451 | .2386 | .2712 | .0325 | .4350 |
| .8900 | 170.0512 | .2311 | .2596 | .0286 | .4222 |
| .9000 | 188.8397 | .2231 | .2479 | .0248 | .4086 |
| .9100 | 211.7410 | .2148 | .2360 | .0212 | .3942 |
| .9200 | 240.2999 | .2059 | .2238 | .0179 | .3787 |
| .9300 | 276.9445 | .1964 | .2112 | .0148 | .3620 |
| .9400 | 325.7211 | .1860 | .1979 | .0119 | .3436 |
| .9500 | 393.9129 | .1746 | .1838 | .0092 | .3231 |
| .9600 | 496.0860 | .1617 | .1684 | .0067 | .2997 |
| .9700 | 666.2290 | .1466 | .1511 | .0045 | .2722 |

-continued

|   | Node Diameter<br>Period<br>Neck Width<br>Node Height |   | D = 0.448 mm<br>w = 0.747 mm<br>g = 0.299 mm<br>H = 0.69696 |   |   |
|---|---|---|---|---|---|
| G | 1/M | D | W | g | H |
| .9800 | 1006.3020 | .1277 | .1303 | .0026 | .2376 |
| .9900 | 2026.1140 | .1012 | .1022 | .0010 | .1885 |

N, lb/in=2.0
E, psi=500000
t, in=0.004

To minimize any time out or nonfunctional area of the belt it is desirable to have the seam width be as narrow as possible. Further, this enables the seam to be indexed so that it does not participate in belt functionality such as the formation and transfer of a toner or developer image. Typically, the seam is from about 1 mm to about 3 mm wide.

With reference to the embodiment illustrated in FIG. 2, the seam may be typically of the order of one inch wide on a belt which is 16 to 18 inches long depending on roll diameter, material modulus or other parameters and the post and head pattern may be formed from a male/female punch cut with each end being cut separately and subsequently being joined to form the seam with a roller similar to that used as a wall paper seamer rolled over the seam by hand to complete the interlocking nature of the puzzle cut pattern.

Figure 7:
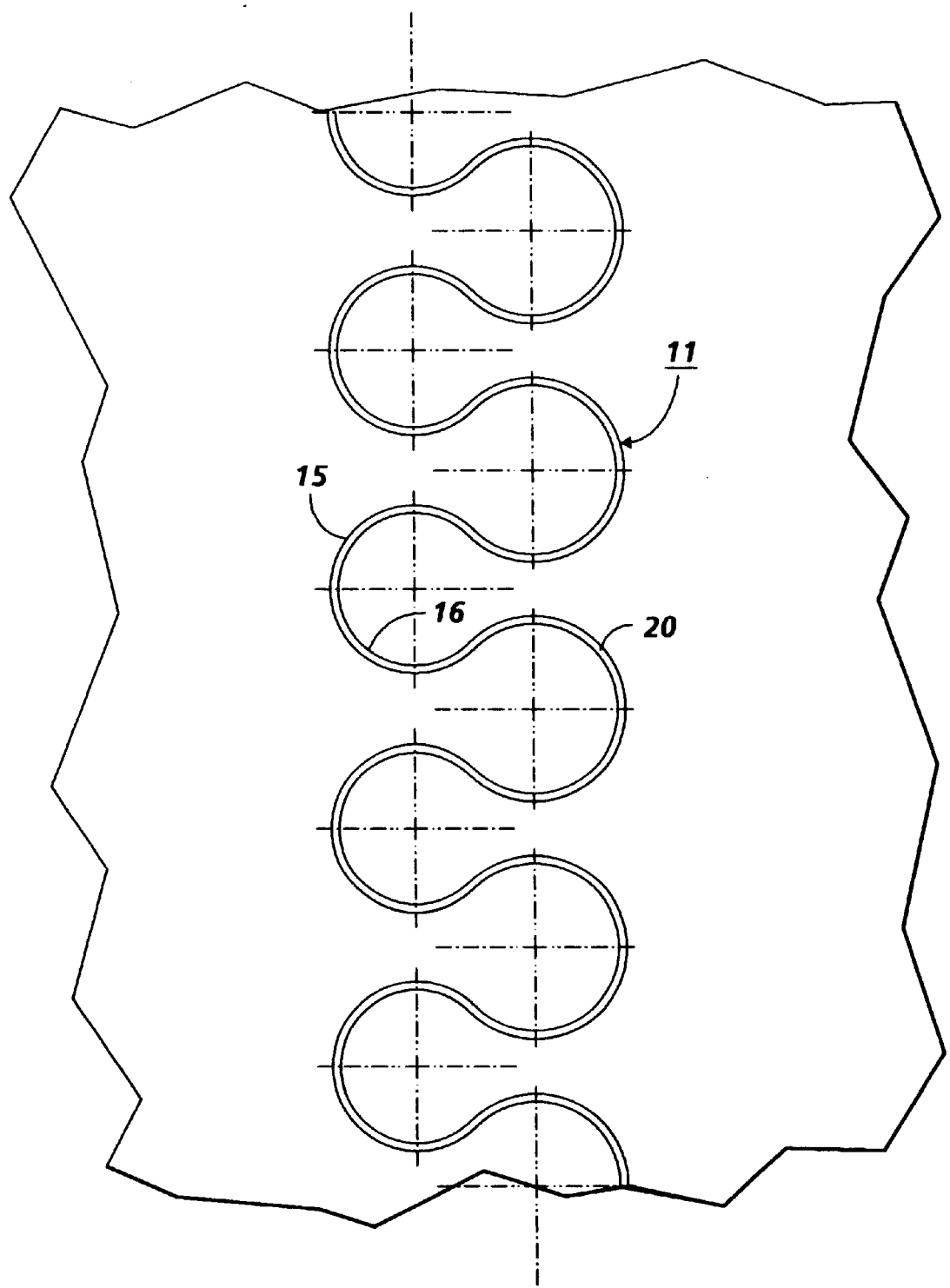
FIG. 7 is a greatly exaggerated in scale representation illustrating essentially no space between interlocking elements.

The two ends of the belt material are joined by physically placing them together in interlocking relationship. This may require the application of pressure to properly seat or mate the interlocking elements. The adhesive material may be the same or it may be different from the material from which the belt was fabricated and may be selected from those materials previously discussed. Typically, it is a heat sensitive thermoplastic or thermoset material. It may be either chemically, and/or physically bound to the belt material. The chemical and/or physical bond between the adhesive and the belt material may also be formed by the application of heat and/or pressure after the adhesive has been applied In a particular application impulse welding may be applied wherein heat and pressure are simultaneously applied to at least soften the belt material and the compatible adhesive material 17 (see FIG. 7) so that it fills the kerf and forms an adhesive bond with the belt material. In this regard, it is important that the heat applied does not exceed that which would both form the seam and break it by melting it or decomposing it. Other heat sources include conventional heated rolls, a simple heated iron, ultrasonic welding or a two roll heated nip providing a combination of heat and pressure.

Preferably, the adhesive material applied is of a thickness to provide a quantity of adhesive to fill the kerf spaces between the two sides of the puzzle cut seam member. In this regard it should also be noted that it may be possible to first apply the heat to, the seam of the belt material and the adhesive and subsequently apply pressure while it is still in a softened condition to force the softened adhesive into kerf or the spaces between the two sides of the puzzle cut seam members. The pressure applied should be sufficient to fill the kerf and to minimize the thickness of any bonded joint. While this process clearly provides a physical bonding between material of the belt seam and the adhesive material, it may also provide a chemical bond. A typical example of this would be one wherein the belt material is a polyimide and the adhesive is a polyimide.

Following fabrication, the belt may be finished by way of buffing or sanding and further, may have an overcoating applied, typically, of a thickness of 0.001 to 0.003 inch in thickness which can be initially applied to the unseamed belt, the belt seam and the seamed area filled from the back of the belt to maintain the uniformity of the functional surface. Preferably, and by far the most economical matter is to form the belt seam initially and then apply the desired overcoating.

The seamed belt according to the present invention may be fabricated in an environmentally acceptable manner in that no solvents are required. The adhesive may be applied to the belt in a suitable manner, such as by being applied from a tubular applicator by squeezing or pushing or being applied by a spatula. It may be applied on one or both sides of the kerf or voided area and is preferably smoothed on it's surface to provide a smooth surface in the seam area of the belt.

EXAMPLE 1

Using a die cutter, a one inch wide polyimide material was mechanically cut to provide a radius of the nodes of about 0.5 mm and the center to center spacing of about 0.70 mm. The ends of the strip of the one inch width polyimide material were then interlocked and rolled with the roller to flatten the seam. A thermoplastic polyamide web material was placed on the lower jaw of an impulse welder Vertrod Corp. Model No. 24H/HT1/4. The previously joined seam was then centered over the webbing material, heat at approximately 350° F. and light pressure were then applied to melt the polyamide web material into the seamed area for approximately 20 seconds. With the seam remaining on the lower jaw of the impulse welder, both sides of the seam were then masked with conventional masking tape, a bead of a polyimide adhesive was squeegeed into the area formed by the masking tape and permitted to flash to release solvent for about 15 minutes after which the masking is removed. The impulse welder is once again clamped again and the seam receives two cycles of 350° F. heat for 35 seconds. The seam remained in the impulse welder for 30 seconds before it was removed and postcured at 400° F. for 2 hours and then room temperature dwell for at least 12 hours. Fourteen, 12 inch long belts were tested in the flex tester and all had flexing cycles exceeding 750,000 with 9 samples exceeding one million cycles. Of the nine belts, which flexed for over a million cycles, the test was discontinued without any of the belts failing. The samples were tested in a flex tester using two pounds in loading, 17 inch per second process speed around the 25 mm drum rollers.

Figure 10:
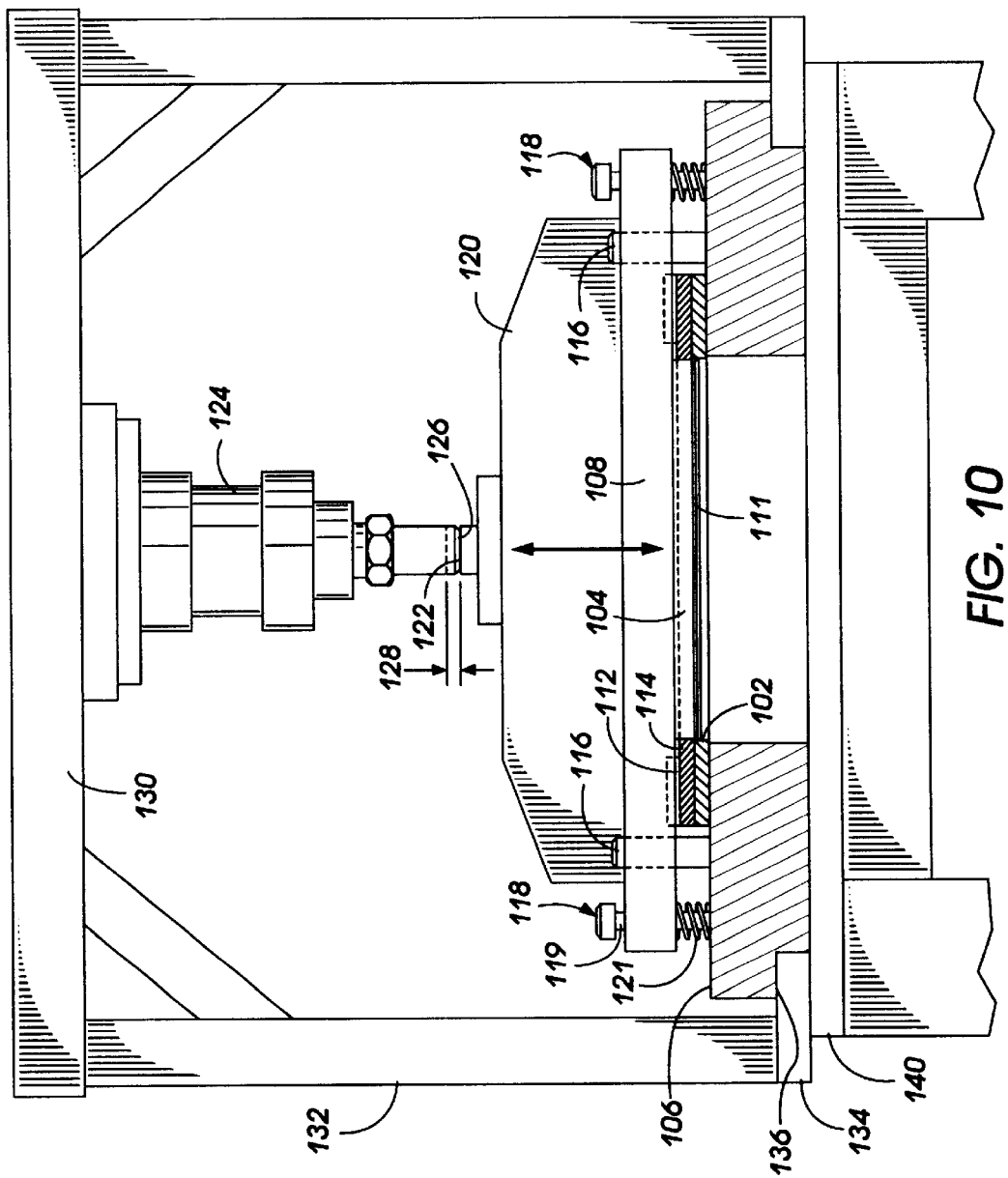
FIG. 10 is a front view of the die press used to form the puzzle cut belt ends.

Turning now to FIG. 10, which shows a front view of the die press assembly used to cut the patterned ends of the belt. Die 102 is supported by die retainer plate 106. Punch 104 is supported over the die 102 by punch retainer plate 108 and punch assembly retainer 120. A stripper 114 surrounds the punch 104, there being a very small clearance between the punch and stripper. Stripper 114 has a puzzle cut pattern which is complementary with the punch puzzle cut pattern so that the stripper assists in locating the punch with respect to the die. The stripper is fixed to die 102 so that a stock gap exists for the belt material 111 to pass between the stripper and die. The stock gap is formed by shims 142 (see FIG. 11) between the stripper and the die. The stripper 114, die 102 and die retainer plate 106 are fixed together and remain stationary during the belt cutting process.

Timing blocks 112 are mounted to both ends of punch retaining plate 108 and are located above stripper 114. Timing blocks 112 cooperate to keep the punch assembly level; when the first timing block hits stripper 114 this causes the punch assembly to level out and when the other timing block hits the stripper, the direction of punch assembly is reversed (discussed below).

Guide posts 116 pass through punch retainer plate 108 and die retainer 106 and assist in keeping all of the punch and die members properly aligned. Punch return assembly 118 connects the punch retainer plate 108 and die retainer 106 and returns the punch to its ready to cut position once the cutting force is removed. Punch assembly retainer 120 supports punch retainer plate 108, punch 104 and timing blocks 112; punch assembly retainer 120, punch plate 108, timing blocks 112 and punch 104 being fixed with respect to each other. Punch assembly retainer 120 is a solid piece of metal and distributes the cutting force along the full length of punch retaining plate 108.

At the top center of the punch assembly retainer is force receiving surface 122. Above force receiving surface 122 is force generating assembly 124 having a force generating surface 126, a cylinder travel gap 128 being formed between the two surfaces when the force generating assembly is in the retracted position The force generating assembly may be a hydraulic press or any equivalent press which can generate sufficient force to cut the belt material. Force generating assembly 124 provides a downward force with force generating surface 124 contacting force receiving surface 122 which supplies the cutting force to the punch assembly until both timing blocks 112 contact stripper 114 (as shown). At this time the force generating assembly force direction is reversed and the cutting force removed. Punch assembly 120 moves upward due to the upward force of spring 121 of punch return assembly 118, the top of the bolt 119 limiting the upward movement of the punch.

Force generating assembly 124 is supported independently of the punch and die members. Force generating assembly horizontal support 130 and vertical supports 132 are attached to die table 140. Vertical supports 132 have a foot member 134. Die retainer 106 supports all of the punch members and die members and is also attached to die table 140. As shown, die retainer 106 has cut out portions 136 on its underside with foot members 134 captured in the cut out portions. This configuration ensures that force generator assembly horizontal support 140 will remain stationary with respect to the die when the cuffing force is supplied by force generating assembly 124.

Rather than having the punch assembly attached to the force generating member as is usual for die presses, the punch members are fixed to the die members by punch return assembly 118. The punch return assembly 118 shown has a plurality of punch return assembly bolts 119 and punch return assembly springs 121, which connect the punch and die assemblies and bias the punch assembly towards the force generating assembly, away from the die assembly, when the cuffing force is removed. This configuration allows the punch and die to remain in close proximity and properly aligned with one another. Any misalignment of the punch and die would result in catastrophic failure when the next punch force is applied.

Figure 11:
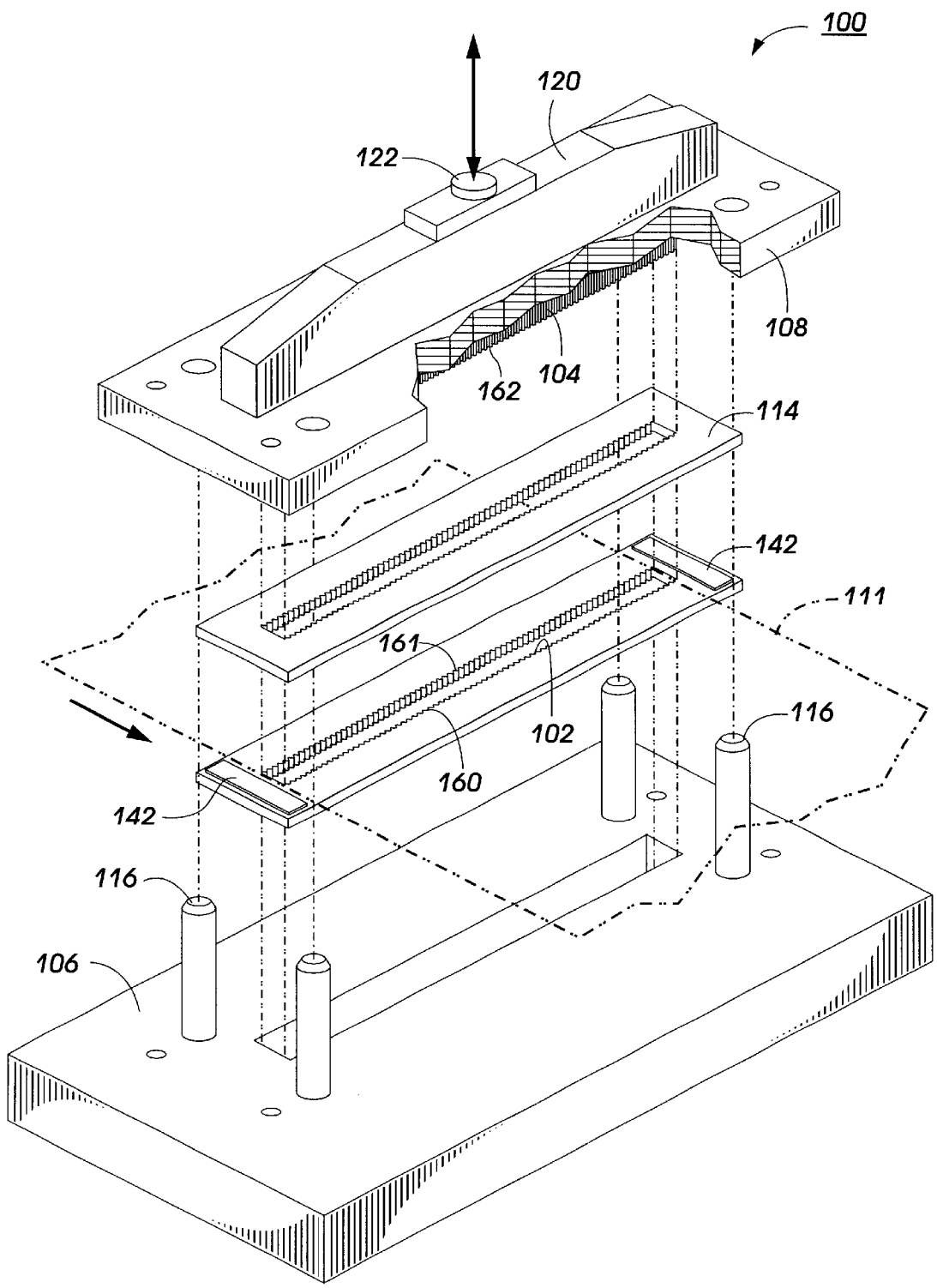
FIG. 11 is an exploded view of the cutting elements in the die press.

An exploded view of the punch and die assemblies is shown in FIG. 11. The cutting assembly 100 is formed of a die 102 and punch 104. The die and punch have complementary surfaces which form the puzzle cut pattern when the cutting operation is performed. Die 102 has two die cutting edges 160 and 161 and punch 104 has two punch cutting edges 162 and another edge (not shown). Die cutting edge 160 and punch cutting edge 162 interact to form the puzzle cut pattern at the first end of a belt and die cutting edge 161 and the other punch cutting edge interact to form a complementary puzzle cut pattern for the second end of a belt. There is a very small clearance between punch cutting edges and the die cutting edges to ensure proper cutting tolerances of belt material 111. A stock gap is formed between stripper 114 and die 102 surfaces with shims 142 spacing the two members for the desired stock gap width.

Stripper 114 holds the cut belt material in place as the punch returns to its pre-cut position, thus performing its stripping function. In operation, the die assembly cuts the second end of one belt at the same time it cuts the first end of another belt. This process results in waste material the width of the die and punch. The belt material is fed through the stock gap in any known manner, for example as a mechanized or hand placement process, the length of the belt being determined by the amount of belt material fed between cutting operations.

The first feature that required development in forming the extremely accurate punch and die cutting edges was the proper steel and heat treatment process to maintain less than 0.04% dimensional change and no warpage when wire cut or ground. After several experiments, the optimum material and process was D-2 steel, 0.5 inch thick die plates hardened to R/C 57 and drawn three times at 1875 Fahrenheit. After hardening, the plates were cryogenically treated to –120 Fahrenheit. Then two more draw operations at 920F and 950F were performed. A cut relief 104 was incorporated in the center of the die to relieve stress prior to hardening. The treated material was then cut using an EDM technique, the punch 102 and die 104 plates being formed separately. Four cutting passes were required to maintain tolerances so that the very small nodes and even smaller spacing tolerances required were produced in the finished punch and die. The last cutting pass was a skimming pass of 0.0002 inches. The length of the die depends upon the desired belt width. The belt width can be as much as 60 inches using the drawing and EDM cutting techniques outlined above.

EXAMPLE 2

Figure 9:
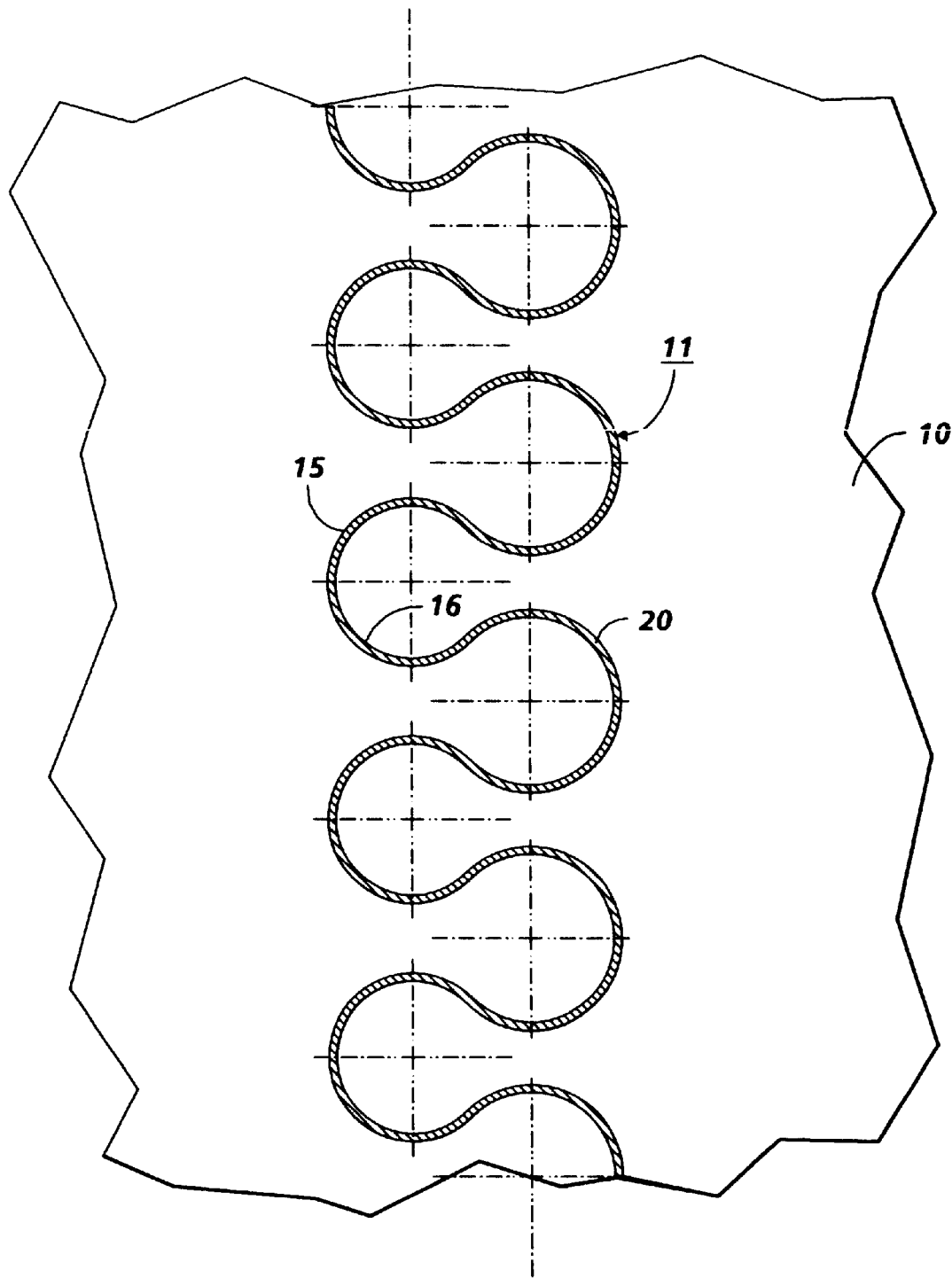
FIG. 9 is a greatly exaggerated representation of the belt seam 11 with the kerf 20 filled with belt compatible material represented by cross hatching.

The particular configuration of the puzzle cut with the rounded puzzle cut pattern will be discussed (see FIGS. 8 and 9), however any desired pattern could be formed with the appropriate punch and die pattern. The approximate clearance between the punch and die patterned edges was 0.0002 inches, the punch and stripper clearance was 0.0001 inches, the clearances being measured on each side of the punch and die. The node diameter was 0.5 mm and the kerf dimension was 25 microns. The punch assembly is returned approximately 0.100 inches above the belt material after the cut is made. The punch and die cutting edges were configured so that the seam is at a slight skew with respect to a 90 degree straight edge belt, which increases the integrity of the seam. The belt material used was Mylar and the width of the belt cut was 18 inches. Different sizes of belts could be cut with one edge of the belt being aligned with one side of the punch/die assembly to insure that the nodes are properly aligned. Using the above shapes, tolerances and materials, a "seamless", i.e. a belt which essentially performs as a seamless belt, puzzlecut transfer belt was produced.

The above cross referenced patent applications together with the patents cited herein are hereby incorporated by reference in their entirety in the instant application. It is, therefore, apparent that there has been provided in accordance with the present invention, a precision punch and die and a die press for forming puzzle cut patterned belts that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

We claim:

1. An apparatus for producing an endless flexible seamed belt from belt material stock, comprising:

a die assembly including a die with a first die cutting edge having a first puzzle cut die pattern having a series of alternating nodes with diameters from about 0.1 mm to about 1.0 mm, wherein the nodes of the first puzzle cut die pattern form a body portion and a neck portion such that the width of the body portion is larger than the width of the neck portion, and a second die cutting edge opposite the first die cutting edge having a second puzzle cut die pattern having a series of alternating nodes with diameters from about 0.1 mm to about 1.0 mm, wherein the nodes of the second puzzle cut die pattern form a body portion and a neck portion such that the width of the body portion is larger than the width of the neck portion;

a punch assembly including a punch with a first punch cutting edge having a first puzzle cut punch pattern that is complementary to the first puzzle cut die pattern and a second punch cutting edge opposite the first punch cutting edge having a second puzzle cut pattern that is complementary to the second die puzzle cut die pattern; and a force generating assembly which generates a cutting force in a cutting operation in which the punch and the die cut the belt material stock such that a first puzzle cut patterned end is formed on a first end of the belt material stock, and a second puzzle cut patterned end is formed on a second end of the belt material stock, such that the first and second puzzle cut patterned ends are able to mate to form an endless belt.

2. An apparatus as claimed in claim 1, the force generating assembly further comprising:

a horizontal and two vertical supports, each of the vertical supports having a foot member which fits under the die assembly enabling the horizontal support to remain stationary during the cutting operation.

3. An apparatus as claimed in claim 1, wherein a first end of one belt and the second end of another belt are cut in the same cutting operation.

4. An apparatus as claimed in claim 1, wherein the belt material stock has a thickness of about 0.004 inches.

5. An apparatus as claimed in claim 1, further comprising:

a force generator surface on the force generating assembly that transmits the force of the force generating assembly to the punch assembly;

a force receiving surface on the punch assembly for receiving the force of the force generating assembly; and a gap formed between the force generator surface and the force receiving surface when the force generating assembly is in a retracted position so that the punch assembly is disconnected from the force generating assembly after each cutting operation.

6. An apparatus as claimed in claim 5, further comprising:

a punch return assembly having
    at least two bolts connecting the die and the punch assemblies together; and at least two springs, one spring mounted on each bolt, the springs biasing the punch towards the force generator surface and the bolts limiting the movement of the punch in a direction towards the force generator surface to about 0.05 inches to 0.2 inches when the cutting force is removed.

7. An apparatus as claimed in claim 1, further comprising:

a stripper member through which the punch passes when the cutting force is applied by the force generating assembly, the stripper member having a first stripper puzzle cut pattern which is complementary to the first puzzle cut punch pattern and a second stripper puzzle cut pattern which is complementary to the second puzzle cut punch pattern, the stripper member stripping the cut belt material stock from the punch.

8. An apparatus as claimed in claim 7, further comprising:

a belt material stock gap formed between the stripper member and the die, the belt material stock gap being from about 0.05 to 0.2 inches.

* * * * *